United States Patent [19]

Barnard

[11] 4,256,050
[45] Mar. 17, 1981

[54] COLLAPSIBLE MARKER CONE

[75] Inventor: Bryon G. Barnard, London, England

[73] Assignee: National Research Development Corporation, London, England

[21] Appl. No.: 68,736

[22] Filed: Aug. 22, 1979

[30] Foreign Application Priority Data

Aug. 29, 1978 [GB] United Kingdom ............... 34846/78

[51] Int. Cl.³ .............................................. E01F 9/01
[52] U.S. Cl. ................................ 116/63 C; 116/63 P; 40/610
[58] Field of Search ................ 116/63 C, 63 P; 404/9, 404/10, 11; 181/178; 40/612, 610

[56] References Cited

U.S. PATENT DOCUMENTS

| | | | |
|---|---|---|---|
| 2,819,547 | 1/1958 | Clements | 40/612 |
| 2,954,005 | 9/1960 | Cioffi | 40/612 |
| 4,006,702 | 2/1977 | St. Cyr | 116/63 P |
| 4,197,807 | 4/1980 | Campbell | 116/63 P |

FOREIGN PATENT DOCUMENTS 1441922  7/1976  United Kingdom .................. 116/63 P Primary Examiner—Gerald Goldberg
Assistant Examiner—Denis E. Corr
Attorney, Agent, or Firm—Cushman, Darby & Cushman

[57] ABSTRACT

A collapsible conical element, particularly in the form of a collapsible road marker cone, comprises a base which is preferably relatively heavy, and a coiled strip, preferably of a resilient plastics material, the outer turn of the strip being restrained from pulling away from the base on extension of the coiled strip to form a cone and the strip having at least two projections, one on each face thereof disposed longitudinally and with the projection on the radially outward face being below the projection on the radially inward face when the cone is in the upright position base down. The base is preferably a substantially planar member, e.g. thick rubber sheeting, with a substantially circular aperture within which the outermost turn of the strip is retained, either by virtue only of the resilience of the coiled strip or with additional fixing. It is convenient to have the radially outward projection at the bottom of the strip and to provide a recess around the aperture in the base under which this projection may be trapped. For extending the strip to form a cone a handle may be provided which is insertable within the innermost turn of the coiled strip and which has a flange which will engage the bottom edge of this turn when the handle is pulled upwards. The strip, for road marker use, may bear designs on those surfaces thereof which are exposed when it is extended to form a cone.

15 Claims, 6 Drawing Figures

COLLAPSIBLE MARKER CONE

The present invention relates to road marker cones.

Conventional road marker cones are rigid articles, generally made of a strong plastics material, and since they occupy a considerable volume and have rather an awkward shape, they are inconvenient to handle, transport and store. Particularly in the case of use for emergency by a motorist for example, such a cone is inconvenient to be carried at all times in the car and it can indeed be impossible to accommodate in some vehicles. There is therefore a requirement for a road marker cone which is collapsible to a small volume when not in use and yet which is quickly and easily erected for use.

Accordingly the present invention provides a collapsible conical element which comprises a base and a coiled strip the outer turn of which is restrained from pulling away from the base on extension of said coiled strip to form a cone, said strip having at least two projections, one disposed longitudinally on each face thereof with the projection on the radially outward face being below the projection on the radially inward face when the cone is in an upright position base down.

The base may take the form of a substantially planar plate-like member which will be flat on the ground when the cone is in the upright position or alternatively the base may be a ring which surrounds the coiled strip. Bases of either of these types may be of metal or of a plastics material or most preferably of a heavy grade of moulded rubber. The base may be provided with small feet to give extra stability. Although normally a separate base will be provided as just described, it is conceivable that, as a further alternative the base may be constituted by the outermost turn or turns of the strip.

The strip may be fastened to the base by for example gluing the two or by rivetting them together or by providing the base with a recess or aperture having a circumferential rim with an inwardly projecting lip underneath which the outermost turn of the strip is trapped to ensure its retention when the strip is extended to form a cone. Most preferably however the strip will be formed of a resilient material and the coil will be retained within an aperture in the base by virtue of its tendency to unwind. Location of the coil in this manner can be made quite positive by providing that a projection on the radially outward face of the coiled strip overlaps the aperture and abuts one face of the base. Most preferably the strip has two longitudinal projections on its outward face and the base is of such a thickness that the projections respectively abut opposite faces of the base.

The strip is preferably made of a plastics material, particularly a material which is resilient and which has a softening point above the ambient temperature of use of the cone. A particularly suitable material is polypropylene though other plastics materials such as high density polyethylene (HDPE) or polyvinyl chloride are also suitable. The advantages of using a plastics material are that the strip with its projections can readily be made by extrusion and that the material itself is relatively cheap, relatively durable and can be coloured which avoids the need for painting the strip. On the other hand it is a significant advantage of the conical element of this invention that the strip can be arranged that the surface to which a design may be applied in order to give a display on extension of the element will not rub across other surfaces of the strip when the element is collapsed and hence any design applied to that surface will not be damaged by the rubbing together of adjacent surfaces as the cone is erected or collapsed.

In making up a cone according to the invention it is convenient to extrude the strip as a continuous length with the projections, and to wind the strip on a roll. The desired length of strip can then be cut from the roll, tightly wound up and inserted in the opening in a base and allowed to unwind until tightly wedged in the base. The innermost turn may be fixed to itself to form an annulus, but most suitably accommodates a handle having resilient projecting portions which tightly wedge the handle within the innermost turn. Alternatively this turn may be engaged in a buckle, by introducing the buckle endwise onto the strip, and then winding the strip tightly round the buckle. Conveniently the buckle has a handle, and in the case of each type of handle, pulling the handle away from the base will cause the cone to be drawn into the fully extended position.

When the innermost turn is pulled away from the base to extend the cone the cone may be stood on its base on the ground for use as with a conventional marker cone. The cone is prevented from being pulled so far out as to cause the strip to unwind by interengagement of the projection on the radially outward face of a turn of the coiled strip with the projection on the inner face of the next outer turn. If the strip is made of resiliant material, it will, when thus extended, tend to remain in that position on account of the tendency of the coiled strip to unwind, and as a result of the friction thereby generated between successive turns of the strip. However, if desired or if the frictional forces are insufficient to positively retain the cone erect a locking ridge may be formed on a face of the strip such that the cone will lock into its extended position by engagement of one of the projections behind the locking ridge. Alternatively or additionally the cone may be made self-erecting by incorporating a coil spring to bear on the innermost turn of the coiled strip or on the handle engaged within this turn and a constraint means to prevent the spring from acting until desired. Whether or not the cone is self-erecting, it may be collapsed simply by pushing down on the top of the cone, though if the frictional resistance to doing this is significant the innermost turn of the strip may be twisted a little so as to slightly "wind up" the coild and hence reduce frictional contact between adjacent surfaces. This method may also be used in the case where the strip is provided with a locking ridge in order to be able to get the "locked" projection to pass over the ridge, and so unlock the cone.

The height of the extended cone is determined largely by the number of turns, by the length of the strip and by the separation between the interengaging longitudinal projections formed on the faces of the strip. For example where the separation is 19.0 mm (0.75 inch), and with an outer diameter for the coil of 180 mm (7⅛ inches), twenty turns gives a cone height, when fully extended of 458 mm (18 inches). The angle of the cone is determined mainly by the maximum thickness of the strip including the largest projection and the lateral separation between corresponding parts of adjacent turns of the strip.

The (upper) radially inward projection on the strip may be so formed as to have a wiping action on the outer face of the cone as the cone is collapsed so that the cone is always stored with its visible part in a clean condition. Alternatively the wiping edge may be provided by an additional projection on the radially inward face of the strip member. Where it is desired however that the outer surface of the cone should not be rubbed as the cone is erected and collapsed, in order to protect an applied surface coating or pattern from abrasion, then it is preferred to provide two spaced projections each larger than the radially inner projection and disposed longitudinally on the radially outer face of the strip. When formed into a marker cone according to the invention the projection on the radially inner face of a turn of the strip engages between the two projections on the radially outer face of an adjacent turn to limit relative movement between adjacent turns. It should be arranged that the upper one of the radially outward projections is still in contact with the radially inner surface of the adjacent turn when the cone is fully erected. Of course, only that part of the outer face of each turn which extends above the upper or the two outer projections can normally be visible in the erected cone. In practice erection and collapsing of the cone is simplified by the provision of projections in the form of two lateral ridges on one face of the strip member as this stiffens the strip against buckling which could cause adjacent turns of the strip to jam together particularly as the cone is being collapsed.

Typically the part of the outer face of the strip which is visible when the cone is erected may carry a retroreflective film and in any case the strip may be so designed that the cone displays one or more horizontal white bands when erected. To achieve this a strip of white reflective material, conveniently of self-adhesive material, may be applied to the strip before the latter is coiled, eg for insertion into the cone base. The reflective strip should be placed on the strip in such a way as to take account of the tilt of the strip when the cone is extended. This factor should also be considered where other designs or patterns are to be displayed on cones of this invention.

The invention will now be further described by way of example only with reference to the accompanying drawings in which:

FIG. 4B is a somewhat schematic sectional elevation similar to

Figure 4B:
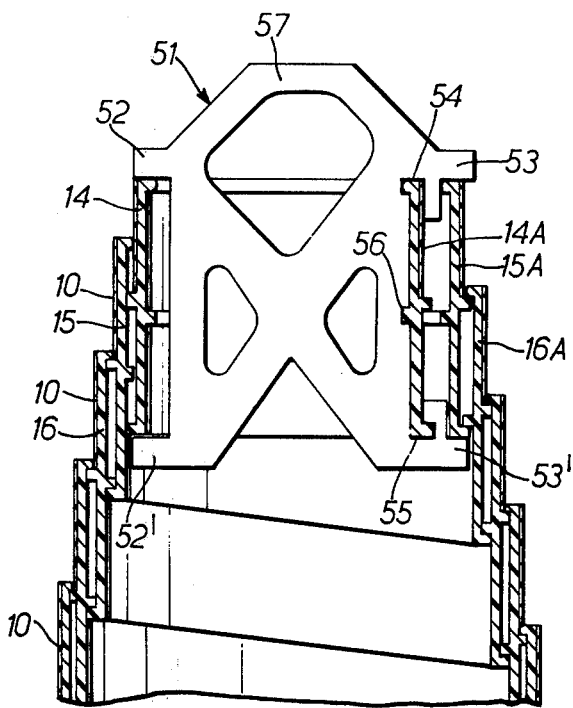
Figure 6:
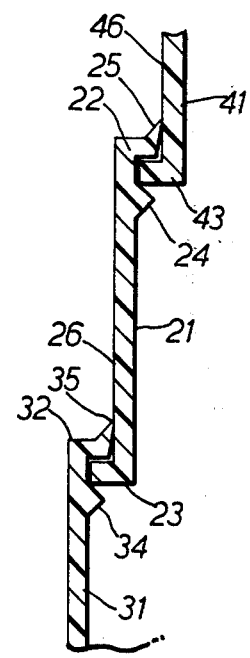
Figure 4A:
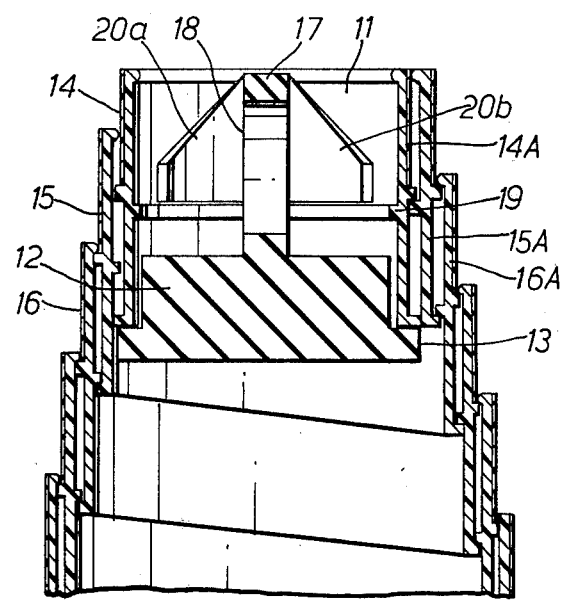
FIG. 4A is a somewhat schematic sectional elevation through the topmost turns of a cone of the type shown in FIG. 3 showing also details of a handle inserted in the cone.
Figure 5:
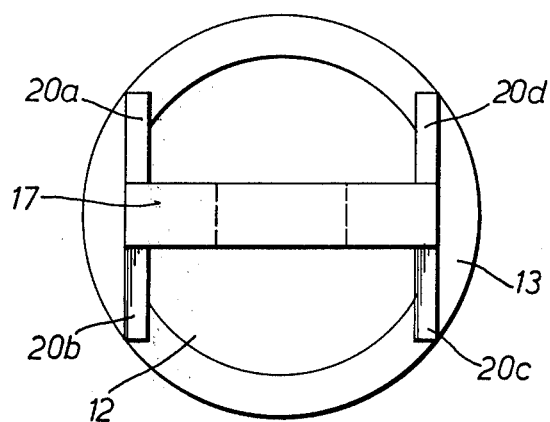

FIG. 4A but showing as an alternative to the handle of FIG. 4A a buckle threaded onto the innermost turn of the coiled strip of the cone;

FIG. 5 is a plan view of the handle of FIG. 4A when removed from the marker cone; and FIG. 6 is a sectional elevation through the wall of an erected cone as formed by a modified design of strip.

Figure 1:
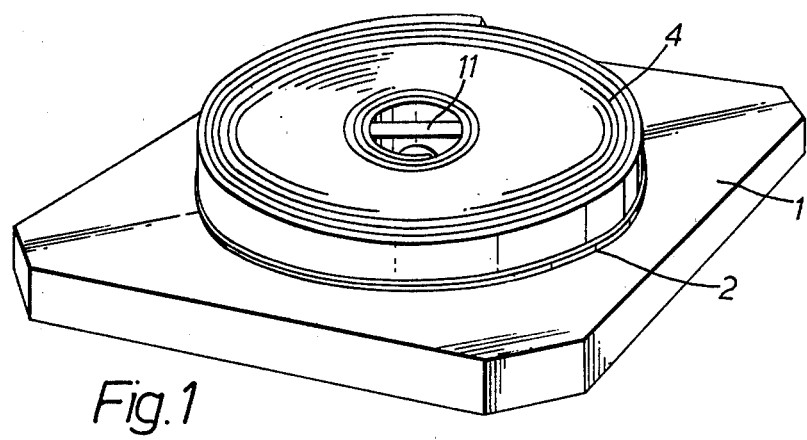
FIG. 1 is a perspective view of an embodiment of the marker cone of the invention in its collapsed condition.
Figure 2:
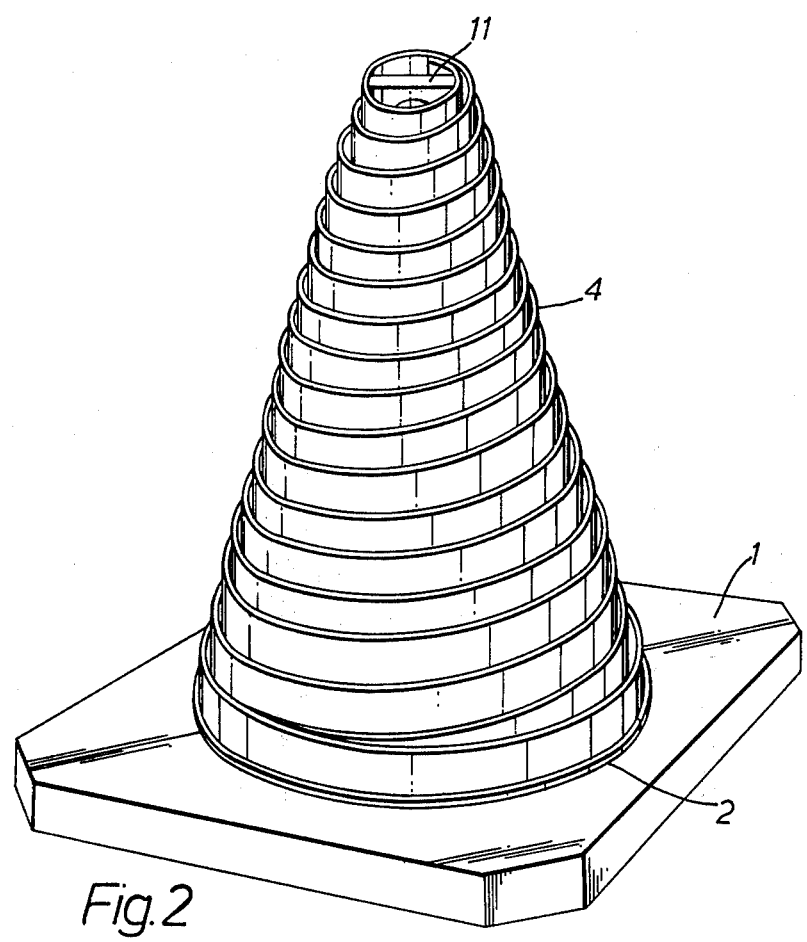
FIG. 2 is a perspective view of the cone of FIG. 1 in its erected position.
Figure 3:
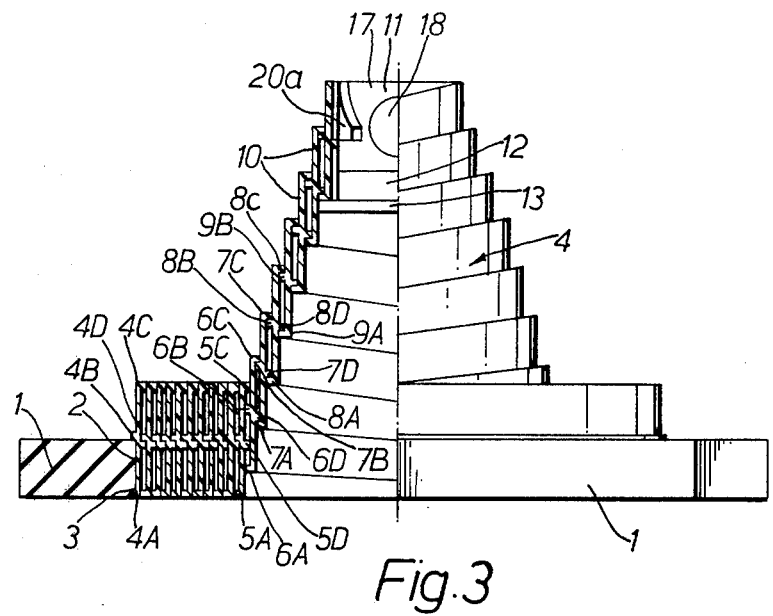
FIG. 3 is a somewhat schematic sectioned elevation through a cone similar to that of FIGS. 1 and 2 when in a partly erected position showing how successive turns mate.

In FIGS. 1 to 3 the cone base is shown generally at 1 and comprises a substantially square block of heavy grade sheet rubber with a central aperture 2. Adjacent the aperture, the underside of the base has a circumferential recess 3 (FIG. 3). Situated within the aperture 2 is a spirally wound strip shown generally at 4, the outermost turn of which bears against the inner surface of the aperture 2 in the base. The strip is a continuous extrusion having two longitudinal projections (shown at 4A, 4B on the outermost turn) on its outer faces as coiled and two projections shown at 4C, 4D on its inner faces. The projections 4A, 4B on the outer faces locate respectively in recess 3 and on the top face of the bass surrounding opening 2 to positively locate the coiled strip within the opening in the base. By locating projection 4A within recess 3 the base of the cone is kept flat which enhances the stability of the cone.

Referring specifically to FIG. 3, the cone is seen to be partially extended with the outermost turns lying alongside each other but with inner turns 6, 7, 8, 9 fully extended with respect to each other. In this condition the lower outer projections at 6A, 7A, 8A, 9A respectively each abut the underside of the lower inner projection on the next radially outward turn, viz the projections at 5D, 6D, 7D, and 8D respectively, and likewise the upper outer projections at 6B to 9B respectively each abut the underside of the upper inner projection on the next radially outward turn, viz projections at 5C, 6C, 7C and 8C.

The upper part of the outer face of the strip may carry a retroreflective film or any other applied design or pattern as shown at 10. This part of the strip can be prevented from being rubbed when the cone is extended and collapsed by ensuring that the respective projections at A, B and D are equal in size but greater than that at C so that the design-carrying surface on each turn is spaced away from the nose of the inwardly facing projection at C on the next radially outward turn.

In FIGS. 1 to 3 a handle is shown generally at 11. As seen in more detail in FIGS. 4A and 5 the handle 11 comprises a circular body portion 12 having a radially extending flange 13 which bears against the innermost turn 14, 14A (FIG. 4A) of the cone. The body portion of the handle has a central rib 17 with an aperture 18 of a suitable size for insertion of a finger. Extending out at right angles to the central rib and from the vertical edges thereof are four roughly triangular ears 20a, b, c, d. The ears at least should be formed of a resilient material.

When the cone is in the collapsed condition pulling the handle upwards will cause the innermost turn to be drawn upwards and succeeding turns likewise as the corresponding projections on the respective turns come into engagement. When restoring the cone to its collapsed condition pressing down on the handle 11 will cause the bottom edges of ears 20a, b, c, d to bear down on projection 19 on the inner face of the innermost turn and so push this turn and then successively the next outer turns downwards until the cone is fully collapsed.

Although FIG. 5 shows the ears 20a–d as extending straight out, when introduced into the conical element the ears are bent inwards at their extremities to conform to the curvature of the innermost turn of the conical element and this ensures that the ears will abut projection 19 on this turn. Also the ears ensure a central location of the handle and assists in limiting the amount of play between handle and cone which might tend to occur.

A handle of the type shown in FIGS. 4A and 5 is readily introduced into the coiled strip from the underside and to assist in this the top surfaces of the handle are preferably chamferred or curved as shown. The handle is also quite easily withdrawn from the cone should it be necessary so to do. The handle is conveniently made of rubber or of a resilient plastics material.

FIG. 4B of the drawings shows an alternative form of handle 51 in which the end of the strip is positively retained. Handle 51 conveniently takes the form of relatively thin member and extends across a diameter of the innermost turn of the coiled strip. As shown in FIG. 4B, handle 51 has two pairs of ears, 52,52' and 53,53' between which the strip may be accommodated as shown. The innermost turn appears as two sections 14, 14A in FIG. 4 and the end of the strip is held in a tight fit in recesses 54, 55 at one side of the buckle. These recesses accommodate the peripheral projections of the strip. A further recess 56 accommodates the other inwardly—facing projection.

The innermost turn extends around to run between ears 52,52' on the opposite edge of the handle and is shown there at 14. The innermost turn is completed by the strip extending round to pass between the ears 53,53' on the handle 51, as shown at 15A. The next turn thus commences in a position as shown at 15A and spirals downwards engaging with the portion of the strip now lying within it in the manner previously described and as shown in section in FIG. 4 at 15, 16A and 16 respectively. Conveniently the upper part 57 of the handle is shaped to provide a portion which can be gripped by a finger when the cone is to be extended. Other forms of buckle or means of drawing out the cone may of course be employed.

In FIG. 6 a turn of a strip is shown in section at 21, with adjacent turns 31 and 41. The strip has an inward projection and an outward projection shown respectively at 22, 32 on turns 21, 31 and at 23, 43 on turns 21, 41. In the erected position which is illustrated in FIG. 5, projection 23 bears against the underside of projection 32 on the next outermost turn 31, and likewise projection 43 bears against the underside of projection 22 on turn 21. A locking ridge is provided on the inner face of the strip just below the inward projection as shown at 24 and 34 respectively on turns 21 and 31. As the cone is fully extended the nose of the outward projections 23 and 43 rides over the ridge at 34 and 24 respectively and into the recesses formed between the ridges and projections is between 34 and 32 and between 24 and 22 respectively, the recess having a width on the order of the width of the projections 23 and 43. The cone is thereby retained in the erected position.

Depending on the exact shape of the locking ridge it may be possible to collapse the cone either by knocking the noses of projections 23 and 43 back over the ridge or by winding up the cone more tightly which can conveniently be done using the buckle so as to draw the turns successively inwards so that projections 23, 43 will then readily slide over the ridges at 34 and 24 respectively. Where the strip has centrally located projections as with the strip of FIGS. 3 and 4 the locking ridge will be situated below the inward-facing of these two projections ie below the lower rather than the upper of the two projections on the inner face of the strip.

Also in the embodiment illustrated in FIG. 6 the inward projections 22, 32 have a wiping edge 25, 35 formed so as to wipe the outer surface 26, 46 of the next inner turn as the cone is collapsed to its storage position.

It will be appreciated that the form of collapsible cone described in the context of this invention may be useful for any application where a collapsible conical element is required. Thus a coiled strip of plastics, metal or other material having a section as herein described could be used to form, on extension, the cone of a loudhailer, or a conical container or hopper of funnel for liquids or granular solids, for example. Another possible use of the strip is as a flexible and extensible ducting for the conveyance of solids, liquids or gases. For this use, the projections on the strip can be designed to have a sealing function or to accommodate sealing means to prevent leakage from or into the ducting. In some of these applications there will be no separate base for the cone, but the outermost turns of the coiled strip may be fastened together to form a "base" for the conical element.

What is claimed is:

1. A collapsible conical element which comprises a base and a coiled strip the outer turn of which is restrained from pulling away from said base on extension of said coiled strip to form a cone, said strip having a plurality of projections including two projections disposed longitudinally on one face thereof and spaced from each other and an intermediate projection disposed longitudinally on the opposite face thereof so as to be at a height between the heights of said two spaced projections when the cone is in an upright position base down.

2. A collapsible conical element according to claim 1 wherein said intermediate projection is at a height separated from the height of one of said two spaced projections by approximately the width of said one of said two spaced projections when the cone is in an upright position.

3. A collapsible conical element according to claim 1 wherein the projections are so disposed laterally of the strip that when the strip is extended to form a cone both of said two spaced projections are contiguous with an adjacent turn of the coiled strip.

4. A collapsible conical element according to claim 1 wherein the strip has an additional projection on the said opposite face at a height outside the range of heights between the heights of said two projections on the said one face when the cone is in an upright position base down.

5. A collapsible conical element according to claim 1, in which the base comprises a substantially planar member having a substantially circular aperture for containing the outermost turn of the coiled strip.

6. A collapsible conical element according to claim 5, wherein a projection on the outermost turn of the strip engages in a recess formed around the aperture in the base so that the strip does not project below the base when the cone is in an upright position base down.

7. A collapsible conical element according to claim 1, wherein said plurality of projections includes two projections on the radially outward face of the strip, including an upper projection and a lower projection, the upper projection on the outward face engaging an upper surface of the base and the lower projection on the outward face engaging a lower surface of the base when the cone is in an upright position base down.

8. A collapsible conical element according to claim 1, and further having a longitudinally-disposed ridge adjacent one of the projections and defining a recess therebetween in which may be retained a given projection on an adjacent face of the coiled strip so as to lock the strip in its extended position the width of said recess being on the order of the width of said given projection.

9. A collapsible conical element according to claim 1, wherein the uppermost projection wipes the surface of the next inner turn during extension and restoration of the coiled strip.

10. A collapsible conical element according to claim 1 wherein the uppermost projection is spaced apart from the surface of the next inner turn so that it does not directly contact said surface during extension and restoration of the coiled strip.

11. A collapsible conical element acording to claim 1 in which radially outward surfaces of the coiled strip which are exposed when the coil is in its extended position carry a reflective material.

12. A collapsible conical element according to claim 1 in which the strip is formed of resilient plastics material by extrusion.

13. A collapsible conical element according to claim 1, in which the base is formed of moulded rubber.

14. A collapsible conical element comprising a base and a coiled strip the outer turn of which is restrained from pulling away from the base on extension of said coiled strip to form a cone, said strip having at least two projections, one disposed longitudinally on each face thereof with the projection on the radially outward face being below the projection on the radially inward face when the cone is in an upright position base down and further including a handle comprising a body portion, a radially extending flange against which the bottom edge of the innermost turn of the strip abuts and at least two elements extending outwardly of the body portion and bearing resiliently against the inner surface of the innermost turn of the strip thereby positively locating said handle within the innermost turn.

15. A collapsible conical element according to claim 14, in which the outwardly-extending elements bear at their extremities on the inner face of the innermost turn of the strip above a radially inward longitudinal projection.

* * * * *